(12) United States Patent
Ambrozic

(10) Patent No.: US 8,727,544 B2
(45) Date of Patent: May 20, 2014

(54) LENS ADAPTER DEVICE, PARTICULARLY LENS PROTECTING DEVICE

(76) Inventor: Ivo Ambrozic, Munich (DE)

( * ) Notice: Subject to any disclaimer, the term of this patent is extended or adjusted under 35 U.S.C. 154(b) by 468 days.

(21) Appl. No.: 12/440,398

(22) PCT Filed: Sep. 10, 2007

(86) PCT No.: PCT/DE2007/001600
§ 371 (c)(1),
(2), (4) Date: Mar. 6, 2009

(87) PCT Pub. No.: WO2008/028479
PCT Pub. Date: Mar. 13, 2008

(65) Prior Publication Data
US 2011/0205631 A1 Aug. 25, 2011

(30) Foreign Application Priority Data
Sep. 8, 2006 (DE) .......................... 10 2006 042 793

(51) Int. Cl.
*B60R 1/06* (2006.01)
(52) U.S. Cl.
USPC ........................................................ 359/508
(58) Field of Classification Search
USPC .................. 359/507–509, 512; 396/428, 529; 352/197, 244
See application file for complete search history.

(56) References Cited

U.S. PATENT DOCUMENTS

| | | | |
|---|---|---|---|
| 2,298,063 A | 10/1942 | MacPherson | |
| 3,879,742 A | 4/1975 | Smith | |
| 4,687,312 A | 8/1987 | Navarro | |
| 5,223,880 A | 6/1993 | Rapp et al. | |
| 5,315,333 A | 5/1994 | Nash | |
| 6,731,867 B1 | 5/2004 | Sherwin et al. | |
| 2004/0184799 A1* | 9/2004 | Sherwin | 396/448 |
| 2005/0169628 A1 | 8/2005 | Zhang | |
| 2005/0190461 A1* | 9/2005 | Petroff | 359/819 |

FOREIGN PATENT DOCUMENTS

| | | |
|---|---|---|
| DE | 2901982 | 7/1980 |
| DE | 202005004067 | 5/2005 |
| GB | 2359899 | 9/2001 |
| JP | 57024969 | 2/1982 |

* cited by examiner

*Primary Examiner* — Stephone B Allen
*Assistant Examiner* — Kimberly N Kakalec
(74) *Attorney, Agent, or Firm* — Gifford, Krass, Sprinkle, Anderson & Citkowski, P.C.; Douglas L. Wathen

(57) ABSTRACT

A lens attachment device is provided for use with a camera having a housing, the housing having at least one modular insert compartment, wherein each modular insert compartment is adapted to receive an insert having an optical device. The lens attachment device includes a lens protection device having a circumferential surface, a holding frame adapted to fit within the modular insert compartment of the housing. The holding frame holds the lens protection device. The lens attachment device further includes a motor housing for containing an electromechanical drive, and a drive wheel operable to rotate the lens protection device, wherein the electromechanical drive is operable to rotate the drive wheel.

16 Claims, 7 Drawing Sheets

LENS ADAPTER DEVICE, PARTICULARLY LENS PROTECTING DEVICE

REFERENCE TO RELATED APPLICATIONS

This application claims priority to PCT/DE2007/001600, filed Sep. 10, 2007, and DE 10 2006 042 793.9, filed Sep. 8, 2006, the entire contents of each of which are incorporated herein in their entirety.

FIELD OF THE INVENTION

The present invention relates generally to a lens attachment device and in particular, a lens protection device for protecting the camera lens from approaching particles such as rain or snow.

BACKGROUND OF THE INVENTION

The use of cameras, and in particular of movie cameras, frequently takes place under unfavorable conditions in which the camera lens has to be protected from particles such as raindrops, snowflakes or insects, or the like. Specifically, the camera lens needs to be free of such particles to ensure a sufficient image quality.

It is known to position a fast-rotating glass disk in front of the lens so that all approaching particles stuck to the glass disk are hurled towards the circumference of the disk by the centrifugal force produced when rotating the glass disk. Thus, the particles does not obstruct the lens, so as to maintain image quality.

Such a centrifugal lens protection device is disclosed in U.S. Pat. No. 3,879,742 in which a surveillance camera is located in a weatherproof housing having a rotatable disk.

U.S. Pat. No. 5,223,880 describes a centrifugal lens protection device for protecting the camera lens. The protection device is disk-shaped and operable by a magnetic motor. The protection device is configured to be fastened onto the free end of the lens.

U.S. Pat. No. 5,315,333 discloses a rotating disk attached to the front of a camera housing via carriers.

Another like example of a lens protection device having a rotating disk in front of the lens is disclosed in U.S. Pat. No. 6,731,867.

However, current lens protection devices are not easily attached to camera housings, such as a camera housing commonly referred to in the art as a matte box. Accordingly, substantial, time-consuming conversion work is necessary to change an optical lens attachment such as a filter, when current lens protection devices are mounted within the camera housing.

An example of a matte box for a movie camera is shown in U.S. Pat. No. 4,687,312. The matte box includes a frame configured to attach to the front of the camera lens. The matte box includes a light shade for engaging the camera lens and at least one filter is arranged between the frame and the light shade. The matter box further includes a plurality of filter holding modules having matching dovetail slots disposed on the front and rear surfaces of each filter holding module so as to enable the fast assembly and release of any number of like filter holder modules to the frame. A releasable latching mechanism is provided at each module to hold each module in alignment with the adjacent module.

Another example of a matte box, commonly referred to in the art as a compendium, has a modular structure, and is disclosed in German utility model DE 20 2005 004 067 U1. The compendium includes a base having a base carrier which is connected at one side to a lens hood or sun shade having selectively fixed or pivotable blades. On the other side is an arrangement of a plurality of filter holding modules. Each of the filter holding modules connected to each other via quick-fastening and the plurality of filter holding modules is connected to the lens hood. The number of filter holding modules is determined by how many filter holding modules are desired in the link, and any of the individual filter holding modules can be replaced or can be removed from the base matte box by disconnecting the filter module from the link.

Further developments of these matte boxes are available on the market, with a matte box offered under the trade name "ARRI MB-14" being mentioned only by way of example.

SUMMARY OF THE INVENTION

The present invention provides a lens attachment device for attaching a lens protection device, such as a rotating disk to the front of a camera lens so as to protect the camera lens from approaching particles such as rain or snow. The installation and operation of the lens attachment device is simplified as compared to current practice and may be configured to mount onto a camera housing such as a matte box.

The lens attachment device includes a holding frame configured to mount onto the camera housing. The holding frame is further configured to hold the lens protection device. It is anticipated that the protection device may be configured to influence image properties in front of a camera lens as well. Accordingly, the lens attachment device simplifies changing camera accessories such as filters, with respect to currently known systems.

The lens attachment device may be inserted on or into a matte box at any desired position. The lens attachment device simplifies the construction and reduces the weight of camera housings such as a matte box, by reducing parts required to house a lens protection device.

Furthermore, the lens attachment device enables the design of a camera housing configured to house both a rain protection and filter carrier and which weighs approximately half the weight of a conventional camera housing.

Yet another advantage is that the lens attachment device allows for a relatively fast conversion of camera accessories that influence the image properties in front of the camera lens, such as filters.

The lens attachment device includes a mechanical closure device for the holding the lens protection device so as to facilitate cleaning the camera lens.

The lens attachment device may be configured to hold comparatively large diameters of the lens protection devices having a diameter of 118 mm, as opposed to current camera housing devices which house lens protection devices having a diameter of 95 mm.

Lens protection devices in principle work like conventional rain repelling devices. For example, lens protection devices may rotate at 3000 to 3500 revolutions per minute, such a rotation is particularly suitable with movie cameras, but can also be used with photographic cameras, such as photographic cameras commonly referred to in the art as technical cameras.

The lens protection device used with the lens attachment device may be a glass disk. The term "glass" used herein is to be understood in its widest sense as a transparent material made from material such as mineral glass, or plastic.

Additionally it is anticipated that the lens protection device may also exhibit an optical effect. For example, the lens protection device may act as an optical filter which selects the incident radiation in accordance with specific criteria, e.g. in accordance with the wavelength, the polarization state or the direction of incidence.

The holding framework may also be configured to hold two or more lens protection devices, wherein at least one of the lens protection devices is a rotatable glass disk and the others are glass disk filters operable to influence the image. It is anticipated that the rotatable lens protection device may also exhibit optical effects.

If the two disks held in the holding frame are polarization filters, a diaphragm effect can be achieved by tilting one toward the other, wherein the rotation of each disk in different directions a blocks the camera lens or creates absolute light-proofness with a 90° crossing of the polarization filters.

The rotatable disk may be rotated by a drive, and the drive may be integrated into the holding frame mounted onto the lens attachment device.

In a very simple embodiment of the invention, the drive is made with an electric motor operable to rotate a drive wheel. The drive wheel is in contact with the circumferential surface of the lens protection device so as to rotate the lens protection device.

The motor and the drive of the rotating disk will preferably be configured as a whole by the person of ordinary skill in the art so when the rotating disk is a protective glass, a motor with a particularly high speed may be used to rotate the disk, whereas when the function of the disk is to influence the image of captured objects, where the precise position of the disk is of importance, a regulated motor with a downstream transmission is preferably used.

In one embodiment of the lens attachment device the drive is connected to the camera's power supply. However, it is anticipated that the drive's speed may be regulated by the electrical output signals from the camera, such as electrical output signals which control the diaphragm of the camera. This configuration is preferable where the lens attachment device holds a protection device operable to generate an optical effect.

The lens protection device in the holding frame may be rotatably supported by resiliently supported rollers engaging the circumferential surface of the lens protection device, so as to not interfere with the rotation of the lens protection device.

The outer geometrical design of the holding frame is dependent on the camera housing and its respective filter holding modules with which the lens attachment device is configured to be inserted into.

In another embodiment, the holding frame is configured to be an individual module of the matte box, wherein the holding frame includes connection devices configured to connect the folding frame to other individual modules of the matte box, and may be inserted into or set onto the matte box at any desired position.

The connection devices may be dovetail devices at the front side and/or rear side of the holding frame and may include push-and-click connections operable to connect the holding frame to an adjacent module.

BRIEF DESCRIPTION OF THE DRAWINGS

There are shown.

EMBODIMENTS OF THE INVENTION

Figure 1:
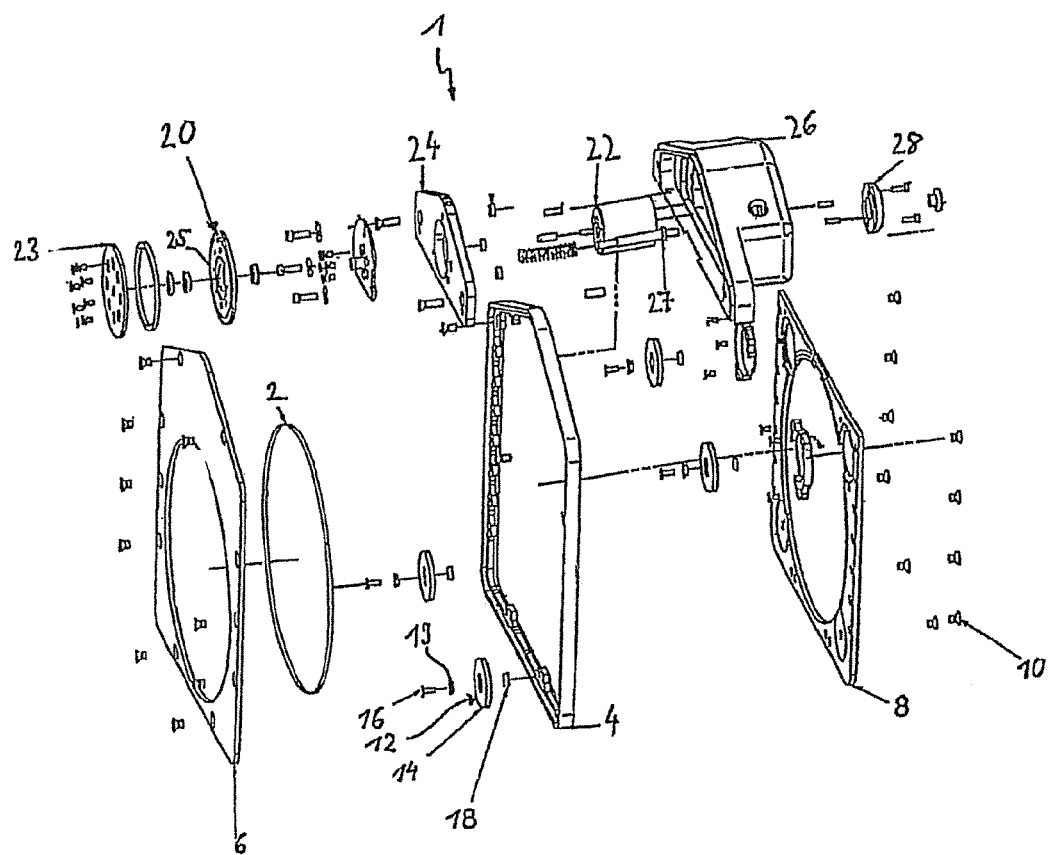
FIG. 1 is an exploded view of a first embodiment of a lens attachment device made as a lens protection device.
Figure 2:
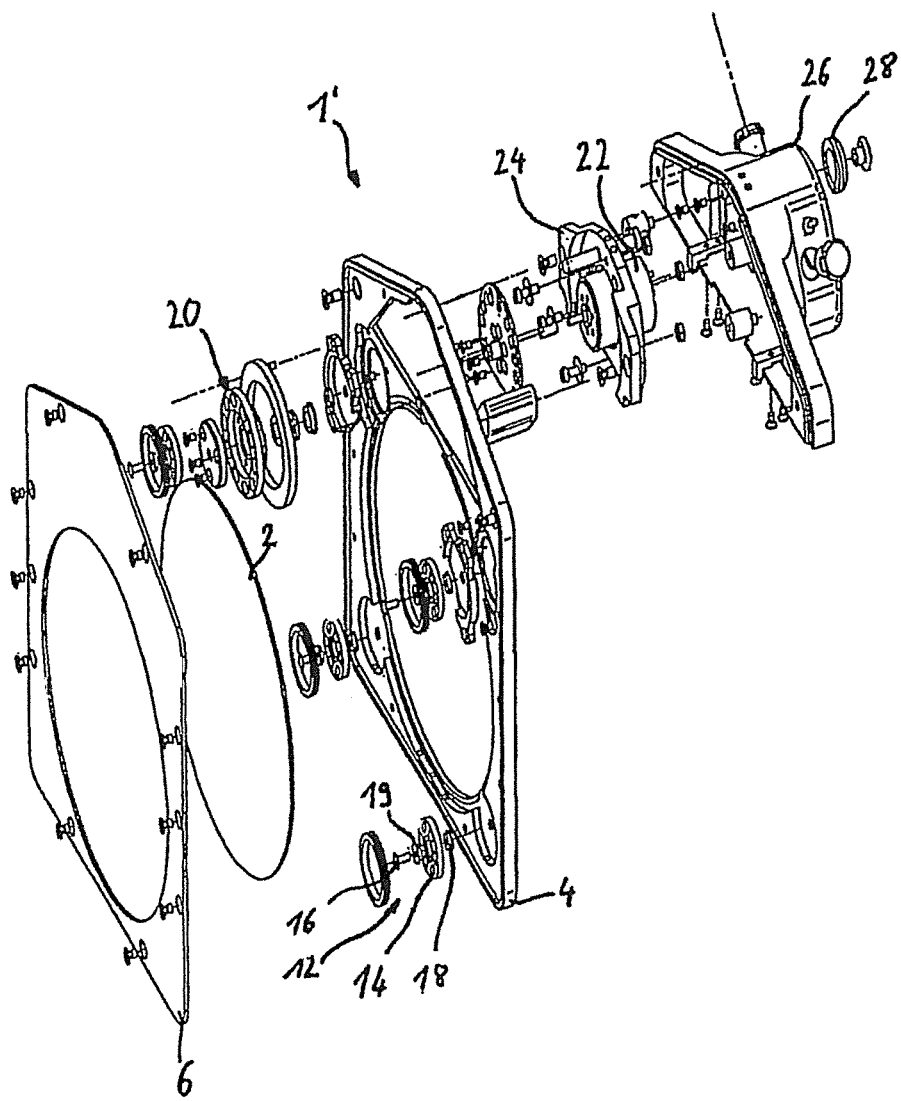
FIG. 2 is an exploded view of a second embodiment of a lens attachment device made as a lens protection device.
Figure 3:
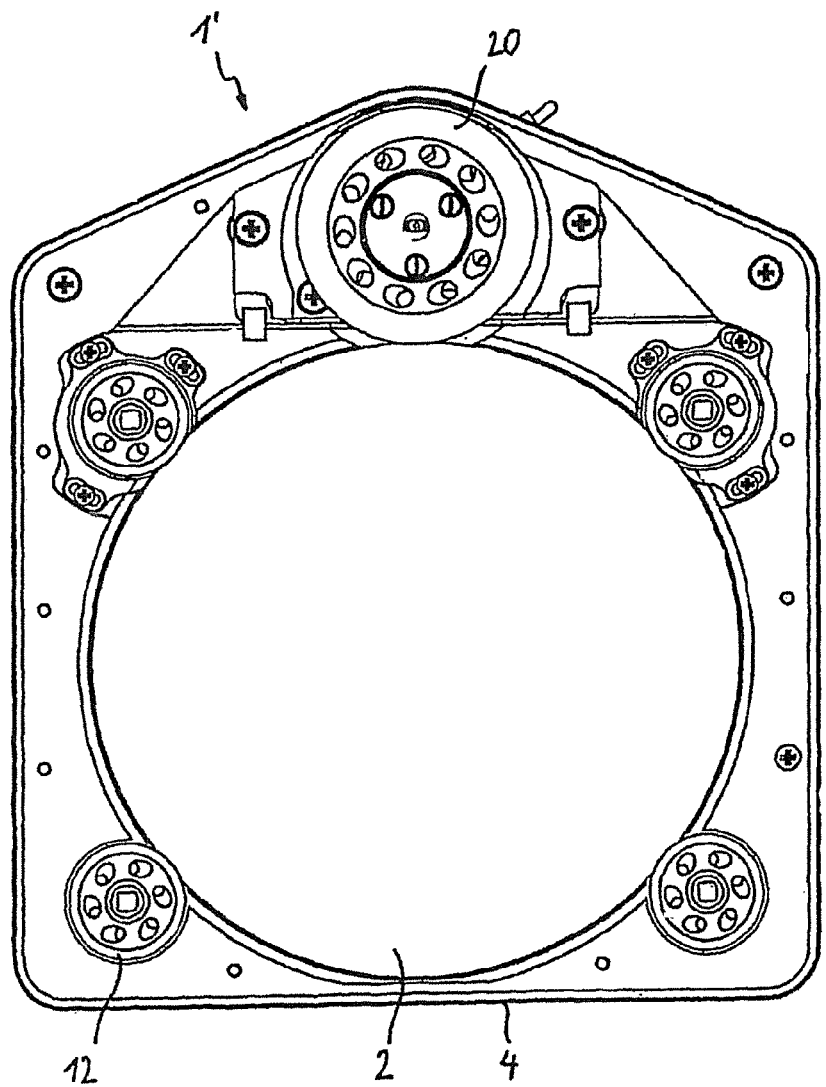
FIG. 3 is a rear view of the lens attachment device of FIG. 2 without a rear cover.
Figure 4:
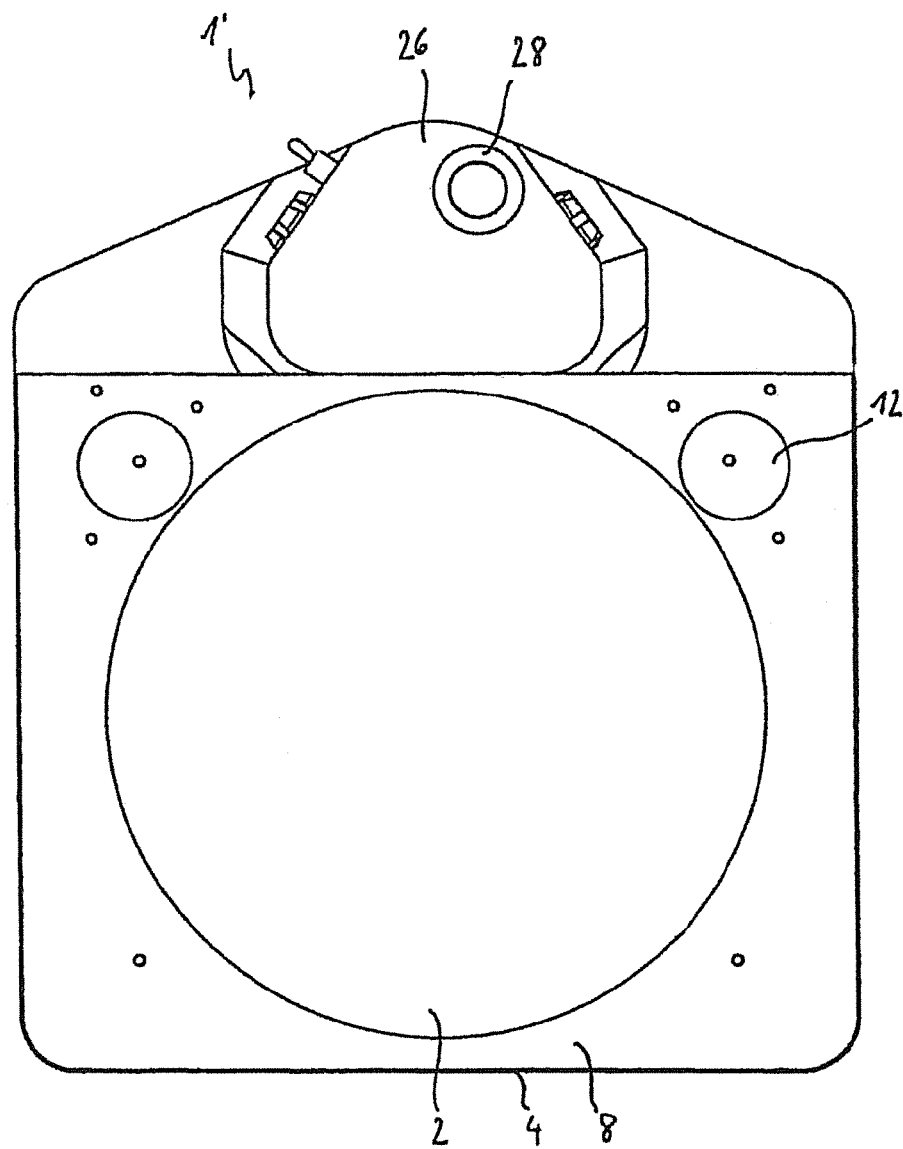
FIG. 4 is a view of the lens attachment device of FIG. 3 without the guide wheels.
Figure 5:
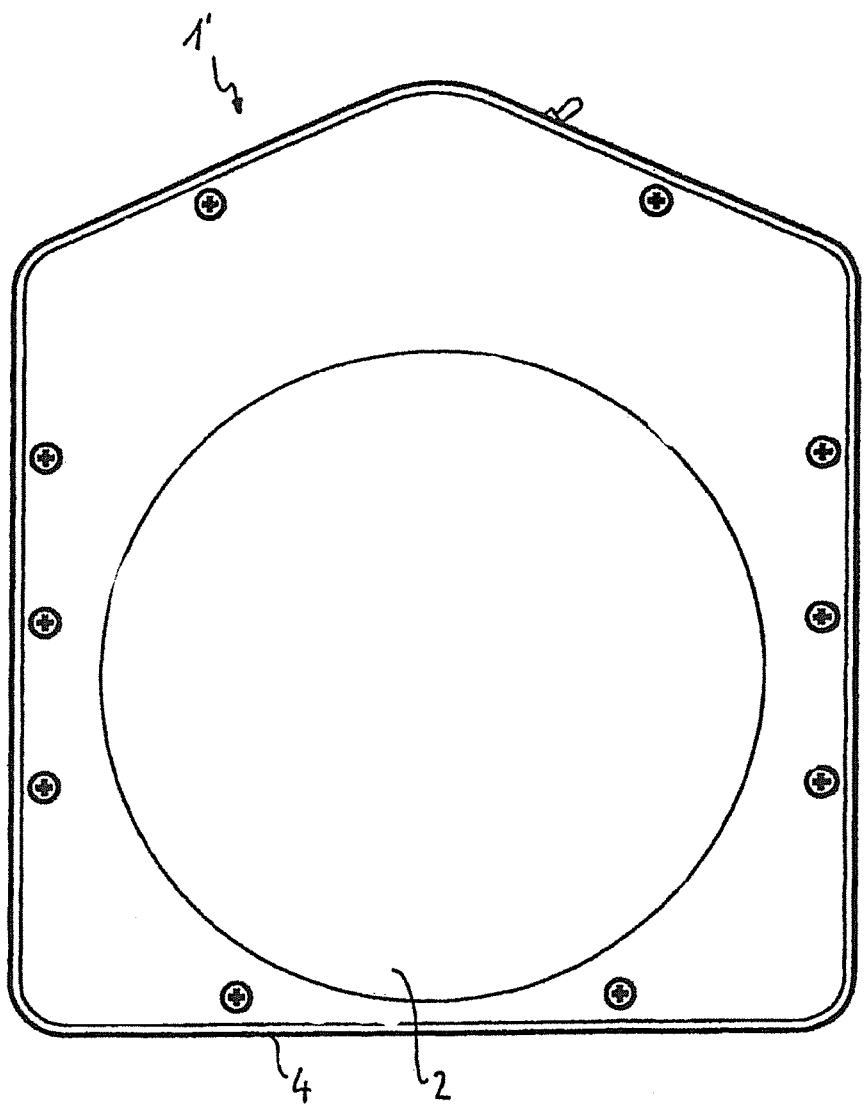
FIG. 5 is a front view of the lens attachment device of FIG. 2.
Figure 6:
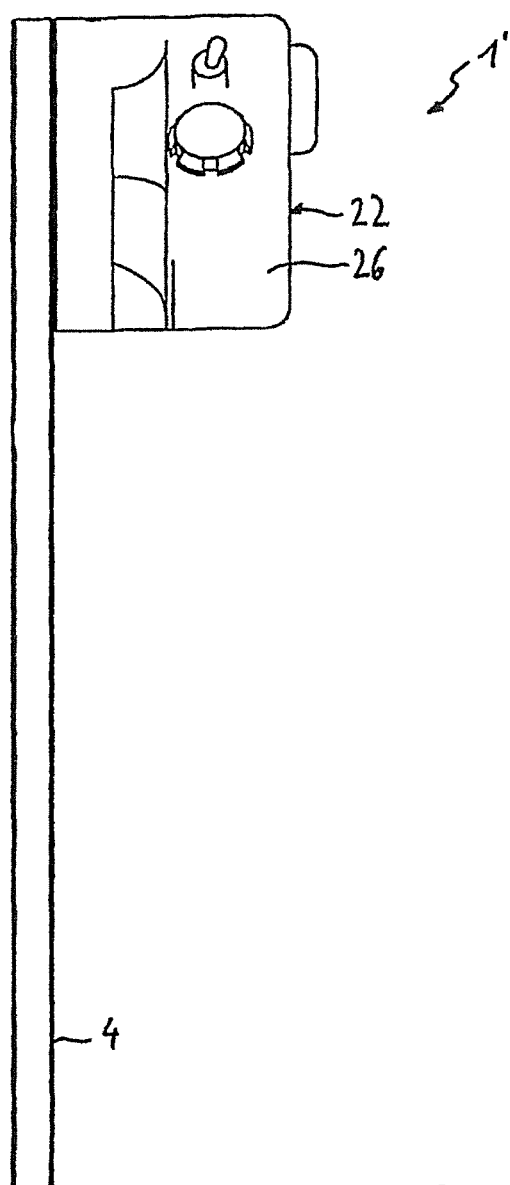
FIG. 6 is a side view of the lens attachment device of FIG. 2.

Respective embodiments of a lens attachment device 1, 1', and 1" are shown in the Figures. Like reference numerals are used for like components of each embodiment. The first preferred embodiment of the lens attachment device is referred to herein as 1. The second preferred embodiment of the lens attachment device is referred to herein as 1'. The third preferred embodiment of the lens attachment device is referred to herein as 1". The lens attachment device 1, 1', 1" may include a lens protection device mounted in front of the camera lens. The lens protection device protects the camera lens and other camera components influencing image properties from particles such as rain, snow or dirt.

The lens attachment device 1, 1', 1" may be an insert for a camera housing device housing camera components influencing image properties of a movie camera, such as the conventional matte box described above.

The lens attachment device 1, 1',1" a disk 2. The disk 2 may be glass rotatably supported in a holding frame 4. Although a cover glass disk 2 is shown in the figures, it is anticipated that the disk 2 may be a filter for generating an optical effect.

The holding frame 4 is configured to be inserted within the filter module of the matte box. The outer dimensions and geometry, of the holding frame 4 allow it to be inserted into the matte box in place of other matte box inserts such as a front filter stage.

When the lens attachment device 1, 1', 1" is assembled, the holding frame 4 is covered on the front side by a front cover 6 and on the rear side facing the camera is covered by a rear cover 8. Each cover has a circular cut-out identical in size to the size of the disk 2.

The installation of the covers 6, 8 onto the holding frame 4 is relatively simple. For example, screws 10 may be used to fasten the covers 6, 8 onto the holding frame 4.

When assembled, the circumferential surface of the disk 2 is encompassed by four guide wheels 12 resiliently mounted onto the holding frame 4. The guide wheels 12 are radially mounted onto the holding frame 4 and each has a wheel hub 14 mounted onto the holding frame 4 via a bearing screw 16 and two collar bearings 18, 19. The collar bearings 18, and 19 may be grooved ball bearings.

The upper guide wheels 12 may be adjusted manually. For instance, the bearing screws 16 may be loosened and the guide wheels 12 can be aligned so as to contact the circumferential surface of the disk 2. The lower guide wheels are not adjustably fixed to the holding frame 4.

The four guide wheels 12 are equally spaced apart from each other and each guide wheel 12 is associated with opposite corners of the holding frame 4. The lens attachment device 1, 1', 1" may further include a drive wheel 20 connected to an electric motor drive 22. Specifically, the drive wheel 20 is disposed between an upper and lower driver plates 23, 25 and the electric motor 22. The drive wheel engages the circumferential surface of the disk 2 in the central upper region of the holding frame 4.

An illustrative example of an electric motor drive 22 for use herein may be a miniature DC motor which is supported by mounting the DC motor within an opening of a carrier board 24. The DC motor may be housed in a motor housing 26 which represents a cap that forms a portion of the holding frame 4 disposed above the rear cover 8. The drive 22 may be integrated into the holding frame 4 and resiliently supported in the radial direction by means of springs, not shown.

A resiliently supported pusher 27 assists with the operation of the electric motor 22. The lens attachment device 1, 1', 1" may further include a protective ring 28 serving as a brake. The protective ring 28 may be disposed at the rear of the motor housing 26 so as to fix the drive wheel 20 the electric motor 22 and prevent the disk from moving axially along the rotor of the motor drive 22. Such an arrangement is advantageous, for example, for the cleaning of the disk 2.

A cable may be used to attach the electric motor drive 22, which may be pulse width modulated, to the camera's power supply.

The lens attachment device 1 may be held together using the screws shown in the figures. Accordingly, replacing the disk 2 is also relatively simple as replacement requires that the rear cover 8 is unscrewed from the holding frame 4 so as to release the disk 2 from the motor housing 26.

With reference now to FIGS. 2-6, a second preferred embodiment of the lens attachment device 1' is provided. The second preferred embodiment differs from the first preferred embodiment with respect to the design of the motor housing 26 and holding frame 4. Specifically, the motor housing 26 and holding frame 4 of the second preferred embodiment are configured to have a narrower width than, the width of the motor housing 26 and holding frame 4 of the first preferred embodiment 1.

Additionally, the lens attachment device 1' of the second preferred embodiment includes buffers 30 mounted onto the electric motor 22 so as to provide three points of support for the rotor of the electric motor 22. The buffers 30 cushion the carrier board 24 which receives the electric motor 22 so as to dampen the vibration caused by the operation of the electric motor 22.

Accordingly, the drive wheel 20 for the disk 2 is cushioned so as to compensate for manufacturing tolerances of the electric motor 22, disk 2, and the guide wheels 12.

Figure 7:
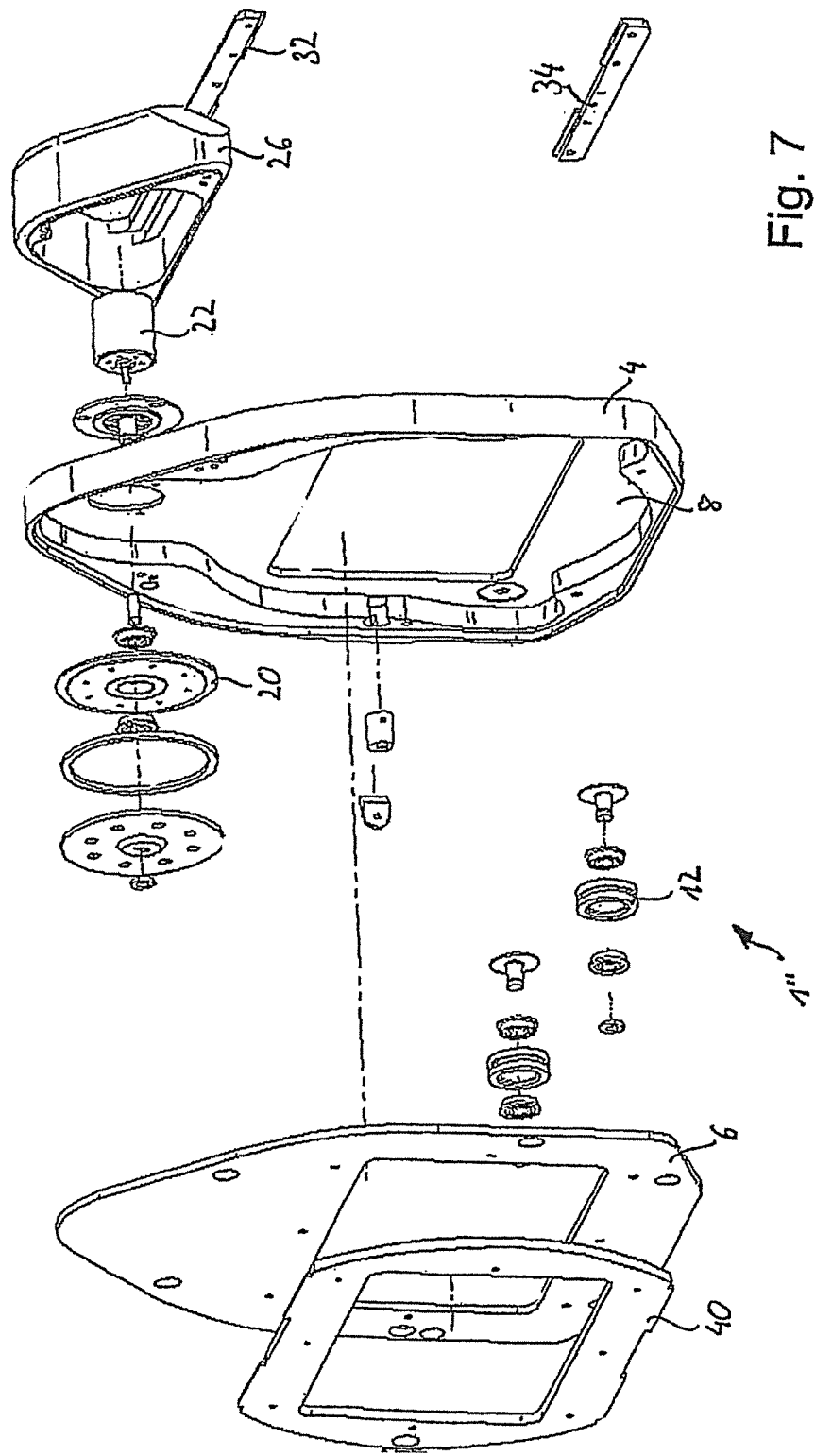
FIG. 7 is an exploded view of a third embodiment of a lens attachment device made as a lens protection device.

With reference now to FIG. 7, a third preferred embodiment is provided. The holding frame 4 includes connection devices 32, 34. The connection devices 32, 34 are configured to connect the lens attachment device 1" to other modules 40 of the matte box. Accordingly, the lens attachment device 1" itself may be considered a module that may be inserted at any desired position within the matte box that is adapted to receive modules. Any connection device currently known and used in the art is suitable for use herein, illustratively including the dovetail devices 32, 34 shown in FIG. 7.

The invention claimed is:

1. A lens attachment device for use with a matte box for a camera, the matte box including a filter holder configured to receive at least one filter therein, the lens attachment device comprising:
    a holding frame adapted to fit into the filter holder of the matte box;
    a transparent disk supported for rotation on the holding frame; and
    a drive operable to rotate the transparent disk with respect to the holding frame;
    wherein the lens attachment device is a lens protection device for protecting a lens from approaching particles.

2. The lens attachment device as set forth in claim 1, wherein the transparent disk has a rim, the drive being an electromagnetic drive having a drive wheel driving the rim of the disk, the electromagnetic drive being integrated into the holding frame.

3. The lens attachment device as set forth in claim 2, wherein the electromagnetic drive is resiliently supported on the holding frame.

4. The lens attachment device as set forth in claim 1, wherein the transparent disk is a neutral cover glass disk.

5. The lens attachment device as set forth in claim 1, wherein the transparent disk is a disk providing an optical effect.

6. The lens attachment device as set forth in claim 5, wherein the transparent disk is an optical filter.

7. The lens attachment device as set forth in claim 6, wherein the optical filter is a polarization filter.

8. The lens attachment device as set forth in claim 1, further comprising a plurality of guide wheels on the holding frame each contacting and supporting the transparent disk, the guide wheels being generally uniformly distributed about the perimeter of the disk.

9. A lens attachment device for use with a matte box for a camera, the matte box having a modular structure and being configured to receive interconnectable modules therein, the lens attachment device comprising:
    a holding frame configured as a module to be received into the matte box, the holding frame having a front side and a rear side, the holding frame having connection devices for connecting one of the front or rear sides of the holding frame to other modules in the matte box;
    a transparent disk supported for rotation on the holding frame; and
    a drive operable to rotate the transparent disk with respect to the holding frame
    wherein the lens attachment device is a lens protection device for protecting a lens from approaching particles.

10. The lens attachment device as set forth in claim 9, wherein the transparent disk has a rim, the drive being an electromagnetic drive having a drive wheel driving the rim of the disk, the electromagnetic drive being integrated into the holding frame.

11. The lens attachment device as set forth in claim 10, wherein the electromagnetic drive is resiliently supported on the holding frame.

12. The lens attachment device as set forth in claim 9, wherein the transparent disk is a neutral cover glass disk.

13. The lens attachment device as set forth in claim 9, wherein the transparent disk is a disk providing an optical effect.

14. The lens attachment device as set forth in claim 13, wherein the transparent disk is an optical filter.

15. The lens attachment device as set forth in claim 14, wherein the optical filter is a polarization filter.

16. The lens attachment device as set forth in claim 9, further comprising a plurality of guide wheels on the holding frame each contacting and supporting the transparent disk, the guide wheels being generally uniformly distributed about the perimeter of the disk.

\* \* \* \* \*